United States Patent
Kalyanasundharam et al.

(10) Patent No.: US 11,972,261 B2
(45) Date of Patent: Apr. 30, 2024

(54) HARDWARE DEVICE FOR ENFORCING ATOMICITY FOR MEMORY OPERATIONS

(71) Applicant: ADVANCED MICRO DEVICES, INC., Santa Clara, CA (US)

(72) Inventors: Vydhyanathan Kalyanasundharam, Santa Clara, CA (US); Joseph L. Greathouse, Santa Clara, CA (US); Shyam Sekhar, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/562,853

(22) Filed: Dec. 27, 2021

(65) Prior Publication Data
US 2023/0205523 A1 Jun. 29, 2023

(51) Int. Cl.
G06F 9/30 (2018.01)
G06F 9/32 (2018.01)
G06F 9/48 (2006.01)
G06F 13/42 (2006.01)

(52) U.S. Cl.
CPC .......... *G06F 9/3004* (2013.01); *G06F 9/3001* (2013.01); *G06F 9/325* (2013.01); *G06F 9/485* (2013.01); *G06F 13/4221* (2013.01)

(58) Field of Classification Search
None
See application file for complete search history.

(56) References Cited

U.S. PATENT DOCUMENTS

| | | | | |
|---|---|---|---|---|
| 5,574,922 A * | 11/1996 | James | ...................... | G06F 9/526 710/200 |
| 8,176,491 B1 * | 5/2012 | Plummer | ................ | G06F 9/526 717/136 |
| 10,282,307 B1 * | 5/2019 | Escriva | ............... | G06F 16/2365 |
| 10,599,485 B2 * | 3/2020 | Levandoski | .............. | G06F 9/52 |
| 2001/0056420 A1 * | 12/2001 | Steele, Jr. | ................. | G06F 9/52 |
| 2007/0169123 A1 * | 7/2007 | Hopkins | ................. | G06F 9/524 718/100 |
| 2009/0222634 A1 * | 9/2009 | Pizlo | ................... | G06F 12/0269 711/E12.001 |
| 2014/0181421 A1 * | 6/2014 | O'Connor | ................ | G06F 9/50 711/148 |
| 2014/0181423 A1 * | 6/2014 | Dice | ....................... | G06F 9/526 711/151 |
| 2019/0258508 A1 * | 8/2019 | Marathe | ............. | G06F 11/1471 |

OTHER PUBLICATIONS

Herlihy, Maurice "Wait-Free Synchronization" ACM Transactions on Programming Languages and Systems, vol. 11, No. 1, 1991, pp. 124-149.

\* cited by examiner

*Primary Examiner* — Eric Coleman (57) ABSTRACT

A system includes a hardware compare and swap (CAS) module communicatively coupled to a bus, the CAS module to perform an atomic operation in response to a first request from a first request agent for the atomic operation to be performed on a data value that is shared among a plurality of request agents and obtain a first result value. The atomic operation includes initiating a CAS command via the bus. The CAS module performs the atomic operation in response to a second request from a second request agent and obtains a second result value. Responsive to determining a failure to successfully process one or more of the first request or the second request, the hardware CAS module repetitively performs the atomic operation, for one or more of the first request or the second request.

20 Claims, 6 Drawing Sheets

HARDWARE DEVICE FOR ENFORCING ATOMICITY FOR MEMORY OPERATIONS

BACKGROUND

Atomic operations are widely used in multi-threaded programming models for synchronization and communication collectives. Within processing systems including multiple processing devices, enforcing atomicity for memory operations is useful in some contexts to reduce errors and provide memory security. Atomicity refers to indivisibility of an operation—either the operation is performed in full or not at all. To enforce the atomicity of an atomic memory operation, coherency across a scope indicated by the atomic memory operation is maintained using certain coherency operations performed within the processing system. However, not all memories, or memory buses, support atomic memory operations. In high-performance computing and machine learning applications, atomic operations are used for atomic addition and increments where a new value is added to an old value in memory. Such operations are conventionally executed at the target in local memory. However, when the new value is in system memory, a memory controller for the local memory and the transport (bus) used for accessing system memory may not natively support the desired set of atomic operations.

BRIEF DESCRIPTION OF THE DRAWINGS

The present disclosure is better understood, and its numerous features and advantages made apparent to those skilled in the art by referencing the accompanying drawings. The use of the same reference symbols in different drawings indicates similar or identical items.

DETAILED DESCRIPTION

One example of an atomic operation is the compare-and-swap (CAS) instruction, which is an atomic instruction used in multithreading to achieve synchronization. Conventionally, a CAS instruction compares the contents of a memory location with a given value (e.g., a parameter value provided with a request for a CAS) and, only if they are the same, modifies the contents of that memory location to a new given value, provided with the CAS request, all performed as a single atomic operation. The atomicity guarantees that the new value is calculated based on up-to-date information, i.e., if the value at the memory location had been updated by another user (e.g., thread) in the interim, the write would fail. The result of the operation indicates whether it performed the substitution, which can be accomplished either via a simple boolean response (also known as a compare-and-set instruction), or by returning the value read from the memory location (i.e., not the value written to the memory location).

FIGS. 1-5 illustrate techniques for enforcing atomicity at a hardware compare and swap (CAS) module of a processing system for memory operations directed at memories and memory buses that do not natively support atomic operations. In some embodiments, the hardware CAS module implements atomic operations within the processing system (e.g., a System on Chip (SOC)) using only an atomic operation provided by a bus resident on the SOC. For example, a Peripheral Component Interconnect Express (PCIe) bus typically provides a CAS operation.

In a multi-threaded scenario, where there are multiple agents operating on a shared variable to perform a Read/Modify/Write (RMW) operation, the RMW typically needs to be performed atomically. Otherwise, the results of one thread could overwrite the results of another thread. To ensure functional correctness, the different threads provide an illusion of sequential execution on the shared variable. In this context, "agent" refers to an entity that performs various actions continuously and autonomously on behalf of a user (e.g., a person, a device, another agent, etc.). A "thread" refers to a basic unit to which an operating system allocates processor time. A thread can execute any portion of process code, including portions currently being executed by another thread.

In some embodiments, the atomic operations include simple integer increments/decrements, floating point addition, floating point subtraction, bitwise boolean operators, signed and unsigned integer arithmetic operators, clamping operators, an f min operation that returns the smallest value of its floating point arguments, and an f max operation that returns the maximal value of its floating point arguments. In some embodiments, the processing system is agnostic to types of atomic operations, i.e., the processing system supports any type of requested atomic operations. In some embodiments, the system supports 16/32/64 bit versions of all the atomic operations. In some embodiments, the system includes one or more storage structures for maintaining operand/result data and associated control logic for sending read requests and receiving responses from the bus. By performing the atomic operations at the hardware CAS module, a processing system can implement atomic operations with low latency, even within a SOC having a conventional bus that does not natively support other atomic operations. By performing atomic operations at the hardware CAS module, a program can successfully target atomic operations at memory locations without needing to know the path the transaction will take to that location and without needing to know the supported atomic operations along that path.

Figure 1:
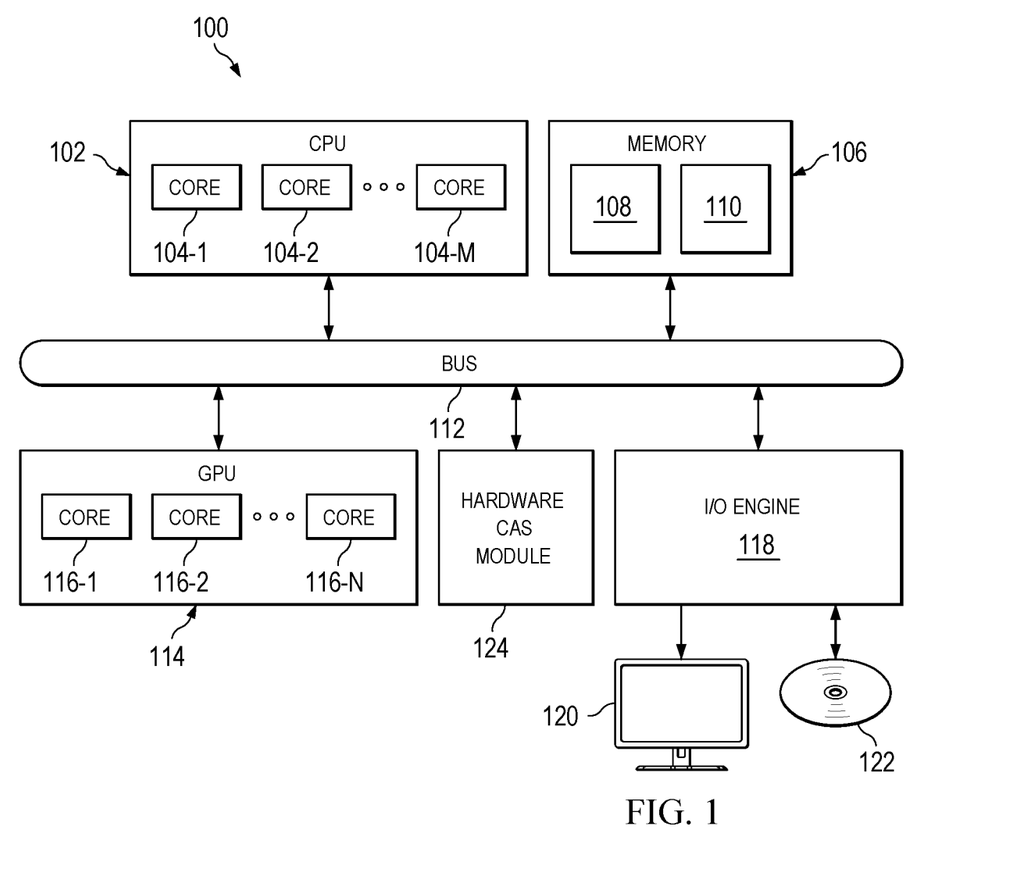
FIG. 1 is a block diagram of a processing system including a hardware compare and swap (CAS) module for enforcing atomicity for memory operations, in accordance with some embodiments.

FIG. 1 is a block diagram of a processing system 100 including a hardware CAS module for enforcing atomicity of memory operations, according to some embodiments. The processing system 100 includes or has access to a memory 106 or other storage component implemented using a non-transitory computer-readable medium, for example, a dynamic random access memory (DRAM). However, in some embodiments, the memory 106 is implemented using other types of memory including, for example, static random access memory (SRAM), nonvolatile RAM, and the like. According to some embodiments, the memory 106 includes an external memory implemented external to the processing units implemented in the processing system 100. The processing system 100 also includes a bus 112 to support communication between entities implemented in the processing system 100, such as the memory 106. Some embodiments of the processing system 100 include other buses, bridges, switches, routers, and the like, which are not shown in FIG. 1 in the interest of clarity.

The techniques described herein are, in different embodiments, employed at any of a variety of parallel processors (e.g., vector processors, graphics processing units (GPUs), general-purpose GPUs (GPGPUs), non-scalar processors, highly-parallel processors, artificial intelligence (AI) processors, inference engines, machine learning processors, other multithreaded processing units, and the like), scalar processors, serial processors, or any combination thereof. FIG. 1 illustrates an example of a parallel processor and in particular a graphics processing unit (GPU) 114, in accordance with some embodiments. The GPU 114 renders images for presentation on a display 120. For example, the GPU 114 renders objects to produce values of pixels that are provided to the display 120, which uses the pixel values to display an image that represents the rendered objects. The GPU 114 implements a plurality of processor cores 116-1 to 116-N that execute instructions concurrently or in parallel. In some embodiments, one or more processor cores 116 operate as SIMD units that perform the same operation on different data sets. Though in the example embodiment illustrated in FIG. 1, three cores (116-1, 116-2, 116-N) are presented representing an N number of cores, the number of processor cores 116 implemented in the GPU 114 is a matter of design choice. As such, in other embodiments, the GPU 114 can include any number of cores 116. Some embodiments of the GPU 114 are used for general-purpose computing. The GPU 114 executes instructions such as program code 108 stored in the memory 106 and the GPU 114 stores information in the memory 106 such as the results of the executed instructions.

The processing system 100 also includes a central processing unit (CPU) 102 that is connected to the bus 112 and therefore communicates with the GPU 114 and the memory 106 via the bus 112. The CPU 102 implements a plurality of processor cores 104-1 to 104-N that execute instructions concurrently or in parallel. In embodiments, one or more of the processor cores 104 operate as SIMD units that perform the same operation on different data sets. Though in the example embodiment illustrated in FIG. 1, three cores (104-1, 104-2, 104-M) are presented representing an M number of cores, the number of processor cores 104 implemented in the CPU 102 is a matter of design choice. As such, in other embodiments, the CPU 102 includes any number of cores 104. In some embodiments, the CPU 102 and GPU 114 have an equal number of cores 104, 116 while in other embodiments, the CPU 102 and GPU 114 have a different number of cores 104, 116. The processor cores 104 execute instructions such as program code 110 stored in the memory 106 and the CPU 102 stores information in the memory 106 such as the results of the executed instructions. The CPU 102 is also able to initiate graphics processing by issuing draw calls to the GPU 114. In embodiments, the CPU 102 implements multiple processor cores (not shown in FIG. 1 in the interest of clarity) that execute instructions concurrently or in parallel.

An input/output (I/O) engine 118 includes hardware and software to handle input or output operations associated with the display 120, as well as other elements of the processing system 100 such as keyboards, mice, printers, external disks, and the like. The I/O engine 118 is coupled to the bus 112 so that the I/O engine 118 communicates with the memory 106, the GPU 114, or the CPU 102. In the illustrated embodiment, the I/O engine 118 reads information stored on an external storage component 122, which is implemented using a non-transitory computer-readable medium such as a compact disk (CD), a digital video disc (DVD), and the like. The I/O engine 118 is also able to write information to the external storage component 122, such as the results of processing by the GPU 114 or the CPU 102.

In some embodiments, the GPU 114, CPU 102, or both receive, perform, create, execute, or any combination thereof instructions causing one or more atomic memory operations to be performed, for example, via bus 112. That is to say, GPU 114, CPU 102, or both can receive, perform, create, execute, or any combination thereof instructions requiring, requesting, or indicating one or more atomic memory operations to be performed. For example, one or more cores of GPU 114, CPU 102, or both create instructions that require one or more atomic memory operations to be performed. An "atomic memory operation," as used herein, includes signals indicating that one or more lockless, concurrent operations are to be executed on target data within the system 100. Such operations include, for example, atomic stores, atomic exchanges, atomic loads, and atomic fetches, to name a few. In embodiments, each atomic memory operation identifies one or more scopes. A "scope," as used herein, includes parameters indicating two or more heterogeneous structures across which the atomic memory operation is atomic (i.e., coherent with). In other words, a scope includes parameters indicating two or more systems, portions of a system, devices (e.g., CPUs, GPUs, accelerated processing units (APUs), field-programmable gate arrays (FPGAs)), portions of a device (e.g., cores), or memory structures (e.g., cache hierarchies, caches, data fabrics) across which the atomic memory operation will be coherent. For example, a scope includes parameters indicating cores of a CPU and cores of a GPU across which an atomic memory operation will be coherent. As another example, a scope includes parameters indicating a CPU and a GPU across which an atomic memory operation will be coherent. In embodiments, the target data (e.g., location, cache, data content) identified by the atomic memory operation includes the location (e.g., memory, cache), data type, content, or any combination thereof of the target data.

To facilitate low latency atomic operations, even within a conventional bus 112 that natively supports only limited atomic operations, the processing system 100 includes a hardware compare and swap (CAS) module 124 that is coupled to the bus 112 via a bus interface (not shown). The hardware CAS module 124 performs atomic operations on data that is shared by a plurality of users, using an atomic instruction that is native to the bus 112. In some embodiments, the native atomic instruction is a CAS instruction, which compares the contents of a memory location with a given value (e.g., a parameter value provided with a request for a CAS) and, only if they are the same, modifies the contents of that memory location to a new given value, provided with the CAS request, all performed as a single atomic operation. The result of the operation indicates whether it performed the substitution (i.e., a "success"), which is accomplished by returning the value read from the memory location (i.e., not the value written to the memory location). The hardware CAS module 124 includes one or more memories (not shown) for storing request values and for storing intermediate values, and response values. The hardware CAS module 124 also includes an arithmetic-logic unit (ALU) (not shown), or an ALU pipe, for performing arithmetic-logic operations (ALU operations) in response to requests for atomic operations, prior to sending CAS requests to the bus 112 for CAS operations on results of the arithmetic-logic operations.

The hardware CAS module 124 determines whether a particular request for the atomic operation succeeds (i.e., the CAS write to the memory location is successful) based on determining that the CAS operation returns the original value that was stored at the memory location prior to the ALU operations of that particular request for the atomic operation. Thus, for example, if the CAS operation returns the original value that was stored at the memory location, the hardware CAS module 124 determines that the atomic operation was a "success". In some embodiments, the hardware CAS module 124 is located near the bus boundary, allowing the hardware CAS module 124 to access the bus faster, advantageously conserving power and processor time.

Figure 2:
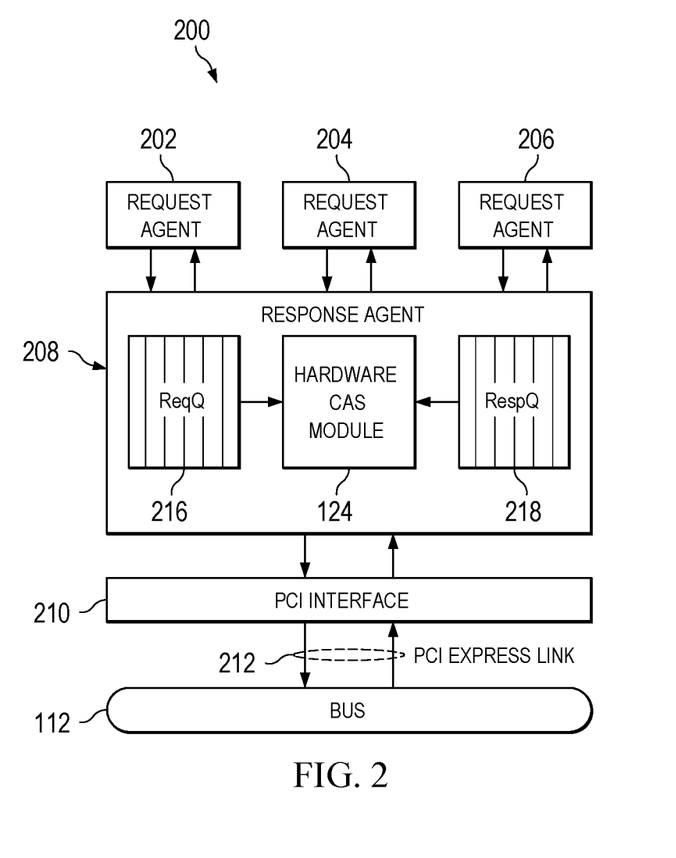
FIG. 2 is a block diagram of the hardware CAS module for enforcing atomicity for memory operations, in accordance with some embodiments.

FIG. 2 illustrates an example 200 of the hardware CAS module 124 for enforcing atomicity for memory operations of FIG. 1, in accordance with some embodiments. As shown in FIG. 2, request agents 202, 204, 206 are communicatively coupled to a response agent 208 that includes the hardware CAS module 124. The hardware CAS module 124 is communicatively coupled to the bus 112. In some embodiments, the bus 112 is a PCI express bus, communicatively coupled to the hardware CAS module 124 via a PCI interface 210 and a PCI express link 212. The response agent 208 includes a memory 216 to store request values (e.g., request parameters) for atomic operations, and a memory 218 to store response values for the atomic operations. In some embodiments, the memory 216 for request values is implemented as a request queue storing values included in request agent requests for atomic operations. In some embodiments, the request agents 202, 204, and 206 include threads executing operations in parallel, to operate on one or more shared variables. In some embodiments, the memory 218 for response values is implemented as a response queue storing values included in request agent responses for the atomic operations.

Figure 3:
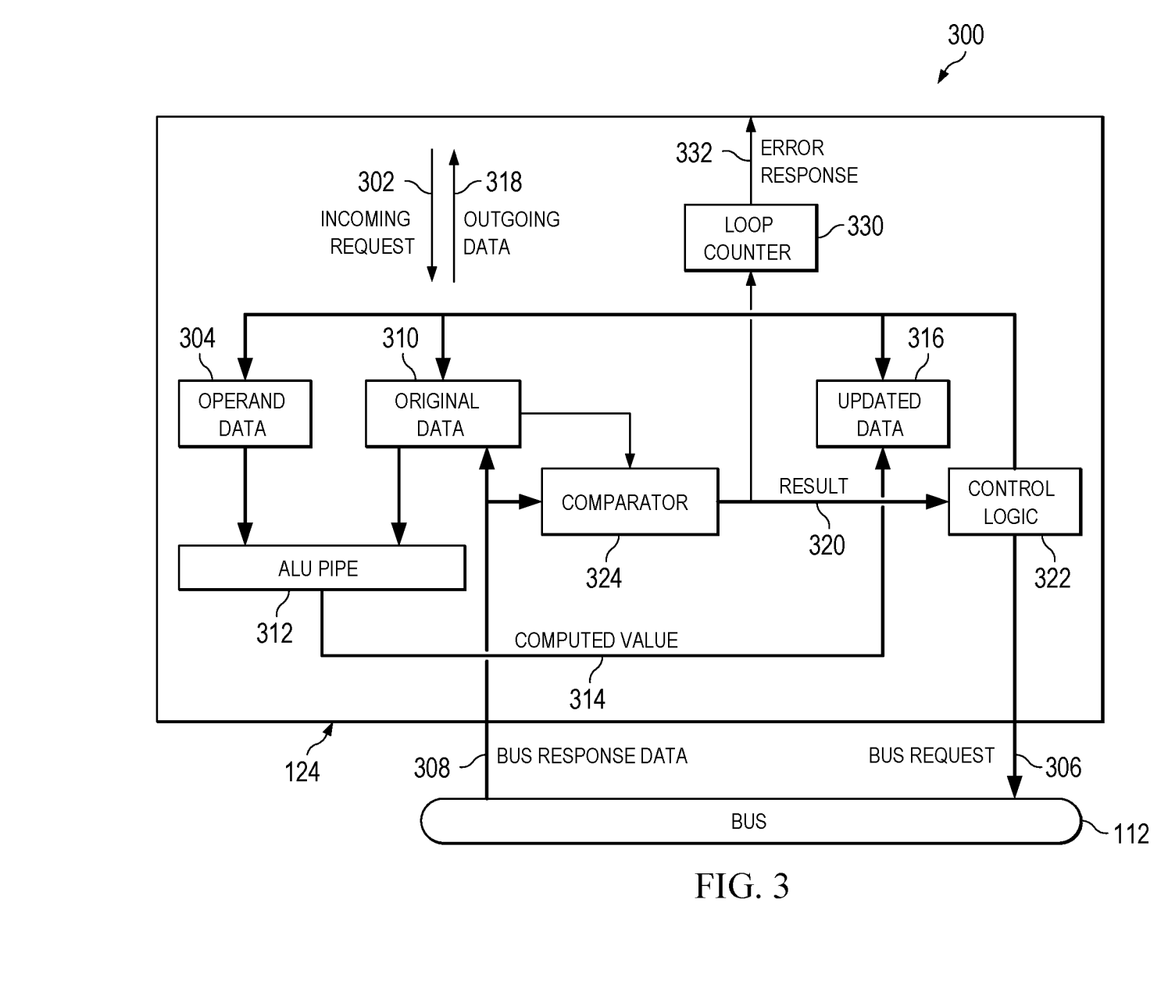
FIG. 3 illustrates an example hardware CAS module for enforcing atomicity for memory operations, in accordance with some embodiments.

In some embodiments, the hardware CAS module 124 is configured to process the data flow 300 of FIG. 3, with incoming requests 302 received from one or more of the request agents 202, 204, 206, and outgoing data 318 provided to one or more of the request agents 202, 204, 206 in response to the incoming requests 302. In some embodiments, the hardware CAS module 124 sends a bus request 306 of FIG. 3 to the bus 112 via the PCI interface 210 and the PCI express link 212.

FIG. 3 is a block diagram 300 illustrating a flow of data through logic blocks and storage of the hardware CAS module 124 for enforcing atomicity for memory operations, in accordance with some embodiments. In some embodiments, the hardware CAS module 124 is communicatively coupled to the bus 112 (e.g., a PCIe bus).

An operand data storage location 304 stores operand data received by the hardware CAS module 124 in requests 302 for atomic operations. An original data storage location 310 stores original data for the atomic operations. An arithmetic-logic unit (ALU) pipe 314 performs arithmetic-logic operations on original data and operand data. For example, the arithmetic-logic operations may include simple integer increments/decrements, floating point addition, floating point subtraction, bitwise boolean operators, signed and unsigned integer arithmetic operators, clamping operators, an f min operation that returns the smallest value of its floating point arguments, and an f max operation that returns the maximal value of its floating point arguments. In some embodiments, the ALU pipe 314 supports 16/32/64 bit versions of all the atomic operations. A comparator 324 compares a plurality of values to generate a comparator result 320. Control logic 322 controls read requests to the bus and responses from the bus.

As shown in FIG. 3, the hardware CAS module 124 receives the incoming request 302 from a requestor (e.g., one or more of the request agents 202, 204, 206). In some embodiments, the one of the request agents 202, 204, 206 retrieves the request 302 is retrieved from a queue entry in the memory 216 of FIG. 2, and sends the request 302 to 202, 204, 206. In some embodiments, the incoming request 302 includes an atomic request (i.e., a request for an atomic operation). In some embodiments, the incoming request 302 includes a physical address on which to operate and operand data. For example, if the operation is an atomic increment, then the operand data includes the increment value. In some embodiments, the request includes a pair of values indicating a physical address and operand data, wherein the physical address is the address on which to operate (e.g., the physical address of the shared variable). In some embodiments, the hardware CAS module 124 stores the operand data of the incoming request 302 in the operand data storage location 304.

The hardware CAS module 124 performs a read from the bus 112 for the physical address from the incoming request 302, shown as a bus request 306, via control logic 322, which is configured to send read requests and receive responses from the bus. The data returned from the bus, shown as bus response data 308, referred to herein as first request data is stored in an original data storage location 310. Thus, the original data storage location 310 stores the original values of the shared variables upon which the hardware CAS module 124 performs the requested atomic operations.

The hardware CAS module 124 sends the operand data (from operand data storage location 304) and the first request data (from original data storage location 310) to the arithmetic-logic unit (ALU) pipe 312. The ALU pipe 312 receives the operand data and the first request data and determines and outputs a computed value 314, for updating the shared variable (i.e., the value stored at the physical address received in the incoming request 302). The hardware CAS module 124 stores the computed value 314 in an updated data storage location 316. The hardware CAS module 124 sends to the bus 112 a CAS command (not shown) that includes the new value to be updated (i.e., the computed value 314), the old value (i.e., the data value of the current request prior to the ALU processing), and the address to be operated upon (i.e., the physical address of the shared variable of the current request). The CAS command performs a read of the physical address of the shared variable, and determines whether the read value equals the old value. If the CAS command determines that the read value equals the old value, the CAS command overwrites the old value with the updated value (i.e., the computed value 314). The data read from the physical address of the shared variable by the CAS command is then sent back to the hardware CAS module 124.

In response to receiving the read response, as bus response data 308, from the bus, the hardware CAS module 124 compares the value of the read response 308 with original data in original data storage location 310 via the comparator 324, generating a comparator result 320. If the comparator result 320 indicates that the value of the read response 308 matches the value of the original data, then the CAS succeeded. If the comparator result 320 indicates that the value of the read response 308 does not match the value of the original data, then the CAS failed, and the hardware CAS module 124 overwrites the original data of the current request in the original data storage location 310 with the new (updated) data and loops by returning to sending the operand data and the newly updated original data to the ALU 112, as discussed above. For example, the comparator result 320 indicates a success status that is either a positive success status (CAS succeeded) or a negative success status (CAS failed, i.e., a failure to successfully process a request for the atomic operation). Thus, responsive to determining a failure to successfully process a request, CAS module 124 the repetitively performs the atomic operation for the request (i.e., executing a loop). The hardware CAS module 124 continues executing this loop until the CAS command completes successfully.

Each repetitive iteration of the loop indicates that the operation did not complete atomically, i.e., some other agent updated the value stored in the physical address of the shared variable. As a result, the new (updated) value is read and the hardware CAS module 124 re-executes the ALU operation (e.g., the add/min etc. is re-executed).

In the illustrated example, there is a potential for "livelock." In some embodiments, if the address targeted by the atomic operation is repeatedly updated by other agents (requestors), then the last step in the process described above fails. In some embodiments, the hardware CAS module 124 then retries the entire operation. However, repetitious retries can potentially result in live-lock. In live-lock, processes repeatedly change their status, which further prevents the processes from completing their tasks. In some embodiments, in order to break the live-lock (e.g., providing live-lock avoidance) the hardware CAS module 124 initiates a reset of a loop counter 330 (e.g., reset to a counter value of 0) when a requested atomic operation attempts to perform a CAS command for the first time. Each time the CAS fails, the loop counter 330 is incremented (e.g., incremented by a value of 1). Once the counter reaches a predetermined threshold (sentinel) value, the hardware CAS module 124 exits the loop and returns the transaction to the originator (i.e., the originating requestor) with a value 332 indicating that an error occurred. In some embodiments, the loop counter 330 is implemented as a timer. For example, if the timer exceeds a predetermined threshold time value (e.g., a programmed sentinel value), the hardware CAS module 124 exits the loop and returns the transaction to the originating requestor with a value 332 indicating that an error occurred.

Figure 4:
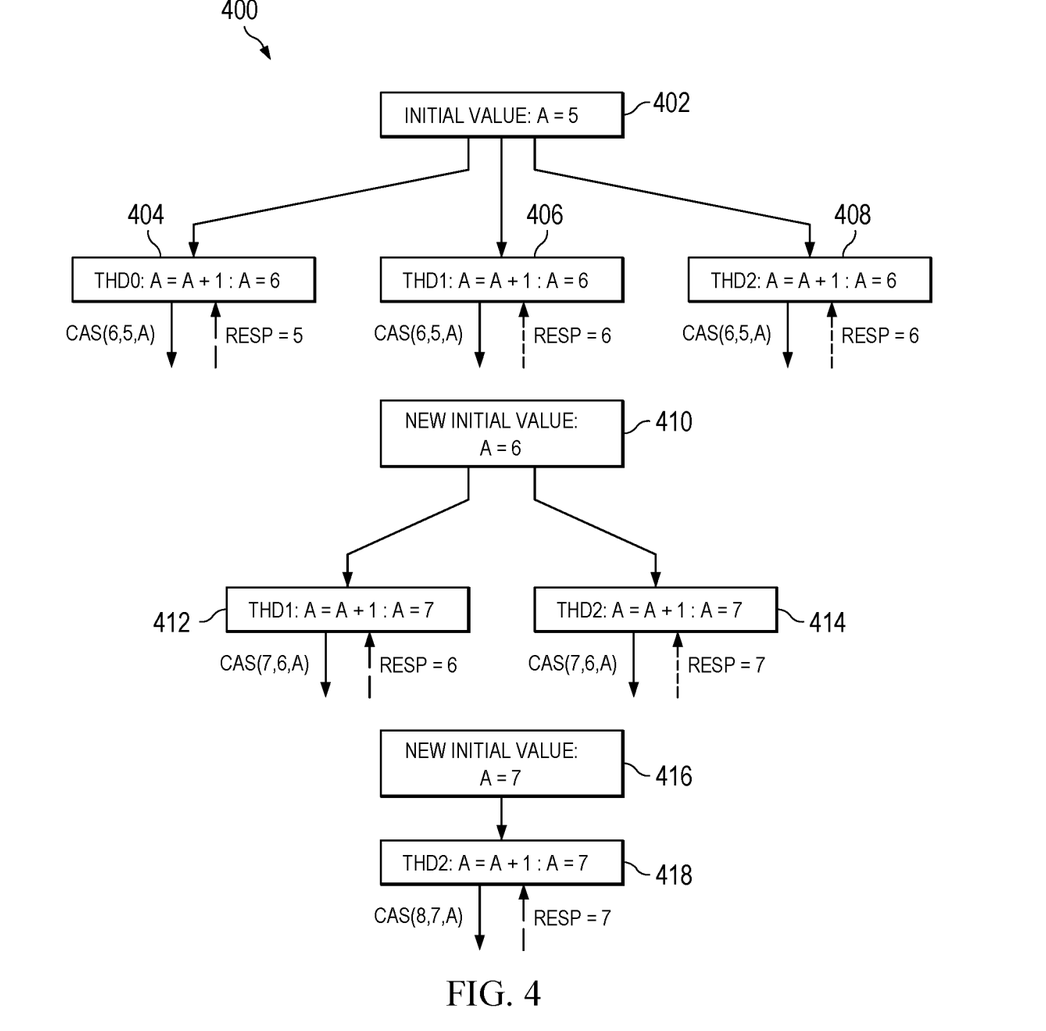
FIG. 4 illustrates an example atomic operation, in accordance with some embodiments.

FIG. 4 illustrates an example hierarchical flow 400 of original and updated data during execution of an atomic operation at the hardware CAS module 124, in accordance with example embodiments. Blocks shown in FIG. 4 represent respective processing in the hardware CAS module 124 for requests received from each of three different threads, denoted as THD0, THD1, and THD2. In the illustrated example, the hardware CAS module 124 modifies a shared variable A with an initial value of 5 in response to requests received from the three different threads. For example, the request agents 202, 204, and 206 of FIG. 2 correspond to three threads labeled THD0, THD1, and THD2, respectively. Each access of the shared variable is intended to increment the value of the shared variable A by 1.

Initially, at processing block 402, all threads read an initial value of 5 via the hardware CAS module 124, and proceed to increment by 1. In processing, the hardware CAS module 124 receives requests from all three threads, with all three requests including the physical address of the shared variable A, and an operand value of 1. The hardware CAS module 124 sends a request to the bus to read the shared variable A and stores the read value in original data storage location 310. The hardware CAS module 124 sends the read value and the operand value (1) to the ALU pipe 312, which in this case is configured to increment the read value by the operand value (1). Thus, all three threads (via a hardware CAS module 124 request to the bus) try to perform a CAS operation with parameters for (new value, old-value, address) being (6, 5, A), at processing blocks 404, 406, 408, respectively. However, only one thread will succeed.

For example, the CAS operation is performed by providing the parameters as incoming request 302 (shown in FIG. 3), with response received as bus response data 308 of FIG. 3, discussed above. In the example illustrated in FIG. 4, THD0 succeeds in processing block 404, because the response of the CAS operation (CAS (6, 5, A)) is a value of 5, shown as RESP=5 for block 404 (indicating that the request of THD0 succeeded in updating the shared variable). The remaining two threads THD1 and THD2 fail. In this example, THD0 at processing block 404 is shown to succeed (i.e., because the RESP value for THD0 is the same as the initial value of A), and THD1 at processing block 406 and THD2 at processing block 408 fail. The hardware CAS module 124 updates the initial value to a value of 6 by storing the computed value 314 (i.e., 6) in the original data storage location 310 at processing block 410. The hardware CAS module 124 sends the updated original data (from the original data storage location 310) and the operand value to the ALU pipe 112 for the requests of each of THD1 and THD2, to obtain the computed value 114 (value of 7 in this iteration) in processing blocks 412, 414, respectively.

The hardware CAS module 124, for the requests of THD1 and THD2, tries to perform the CAS operation with parameters (7, 6, A), at processing blocks 412 and 414, respectively. As explained, only one of them (THD1 at processing block 412 in this iteration) succeeds. In the example, processing block 412 succeeds, since the response of the CAS operation (CAS (7, 6, A)) is a value of 6, shown as RESP=6 for processing block 412. THD2 receives a new initial value of 7 at 316.

The hardware CAS module 124 updates the initial value to a value of 7 by storing the computed value 314 (i.e., 7) in the original data storage location 310 at processing block 416. The hardware CAS module 124 sends the updated original data (from the original data storage location 310) and the operand value to the ALU pipe 112 for the request of THD2, to obtain the computed value 114 (value of 8 in this iteration) in processing block 418.

The hardware CAS module 124, for the request of THD2, tries to perform the CAS operation with an initial value of 7 and performs a CAS operation (8, 7, A) at processing block 418 and finally succeeds. In the example, processing block 418 succeeds, since the response of the CAS operation (CAS (8, 7, A)) is a value of 7, shown as RESP=7 for processing block 418. The final value of the shared variable A is 8, which is what the final value would be if the threads THD0, THD1, and THD2 had performed the increment sequentially.

If the threads THD0, THD1, and THD2 did not utilize the CAS routine discussed above, but simply performed a write, the final value of A would be 6. Each thread THD0, THD1, and THD2 would have tried to write a 6 and the last thread write would update the final value to 6. In this scenario the final value of A would be dependent upon whichever thread happened to update the final value of A last. The final answer could be 6, 7, or 8 depending upon the order of operations. There would be no guarantee of atomicity. In the example technique discussed above, the number of threads can scale to any arbitrary number and operations are enforced to be executed atomically.

Figure 5:
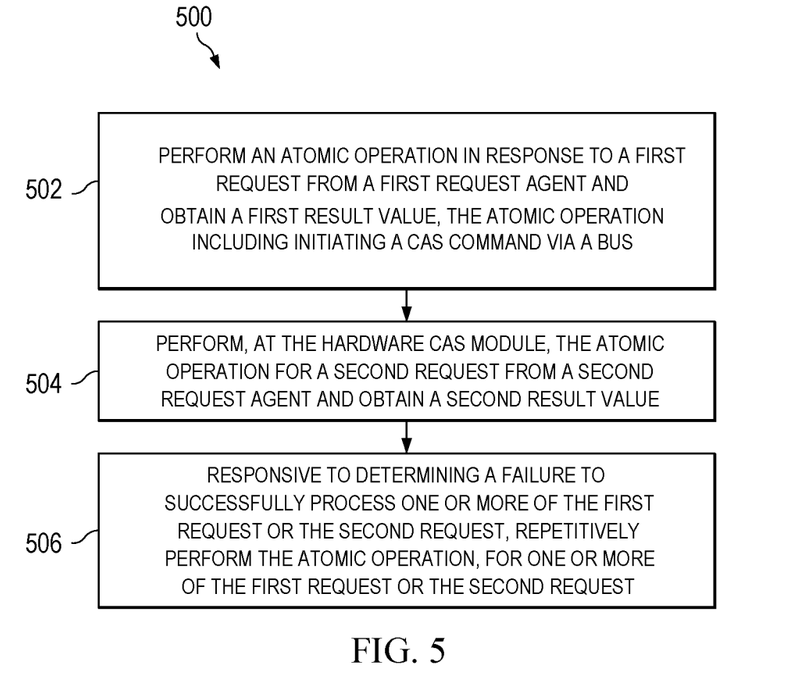
FIG. 5 is a flow diagram illustrating a method for enforcing atomicity for memory operations, in accordance with some embodiments.

FIG. 5 is a flow diagram 500 illustrating a method for enforcing atomicity for memory operations at a hardware CAS module, in accordance with some embodiments. At block 502, an atomic operation is performed in response to a first request from a first request agent and a first result value is obtained, the atomic operation including initiating a CAS command via a bus. For example, the hardware CAS module 124 performs the requested atomic operations. For example, the incoming request 302 of FIG. 3 is a request for an atomic operation to be performed on a data value that is shared among a plurality of request agents.

At block 504, the atomic operation is performed for a second request from a second request agent and obtaining a second result value. At block 506, responsive to determining a failure to successfully process one or more of the first request or the second request, the atomic operation is repetitively performed, at the hardware CAS module, for one or more of the first request or the second request.

Figure 6:
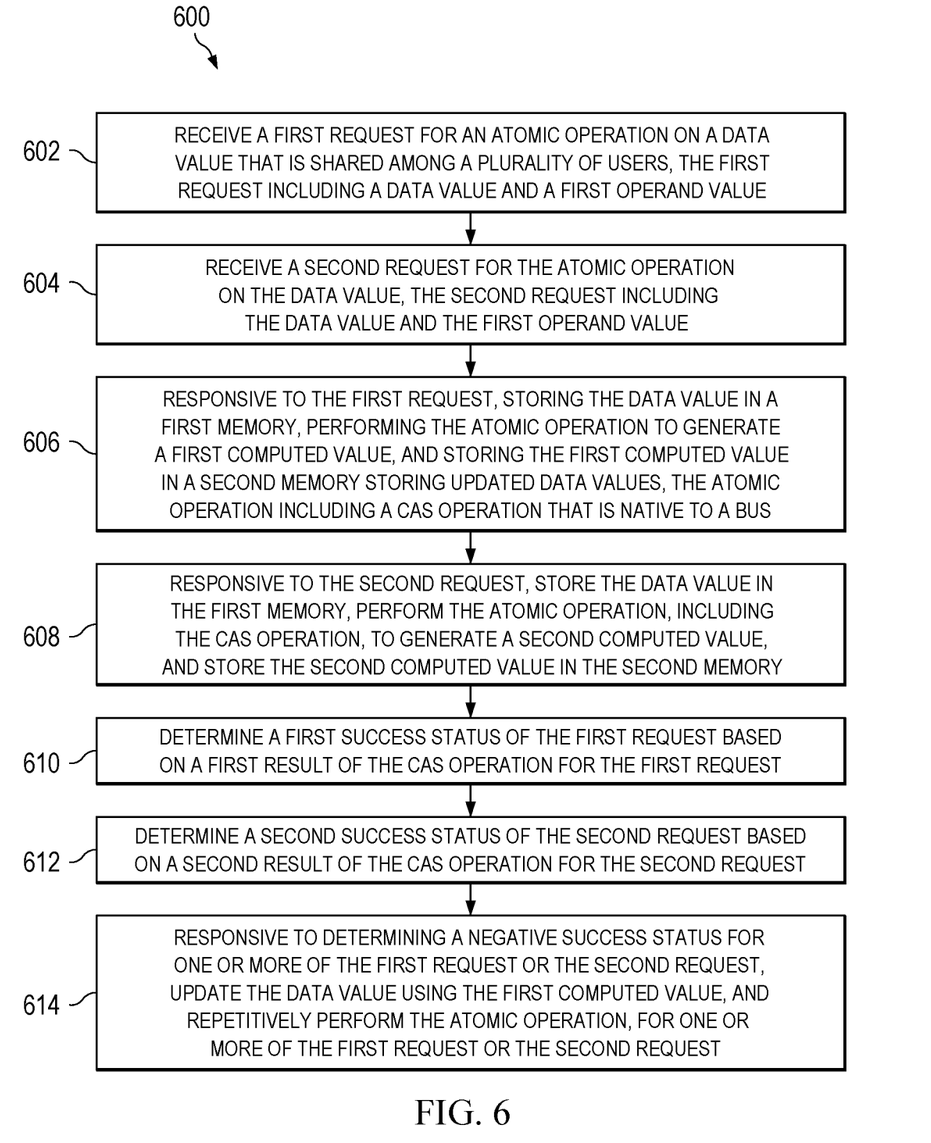
FIG. 6 is a flow diagram illustrating a method for enforcing atomicity for memory operations at a hardware CAS module, in accordance with some embodiments.

FIG. 6 is a flow diagram 600 illustrating a method for enforcing atomicity for memory operations at a hardware CAS module, in accordance with some embodiments. At block 602, a first request for an atomic operation on a data value that is shared among a plurality of users is received at a hardware compare and swap (CAS) module, the first request including a data value and a first operand value (e.g., the incoming request 302 of FIG. 3). At block 604, a second request for the atomic operation on the data value is received, the second request including the data value and the first operand value.

At block 606, responsive to the first request, the data value is stored in a first memory, the atomic operation is performed to generate a first computed value, and the first computed value is stored in a second memory storing updated data values, the atomic operation including a CAS operation that is native to a bus that is communicatively coupled to the hardware CAS module. At block 608, responsive to the second request, the data value is stored in the first memory, the atomic operation, including the CAS operation, is performed to generate a second computed value, and the second computed value is stored in the second memory. At block 610, a first success status of the first request is determined based on a first result of the CAS operation for the first request. At block 612, a second success status of the second request is determined based on a second result of the CAS operation for the second request.

At block 614, responsive to determining a negative success status for one or more of the first request or the second request, the data value is updated using the first computed value, and the atomic operation is repetitively performed, for one or more of the first request or the second request.

In some embodiments, the apparatus and techniques described above are implemented in a system including one or more integrated circuit (IC) devices (also referred to as integrated circuit packages or microchips), such as the processing system described above with reference to FIGS. 1-6. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may be implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   performing, at a hardware compare and swap (CAS) module of a processing system, an atomic operation in response to a first request comprising a data value that is stored at a first memory from a first request agent and obtaining a first result value, the atomic operation including initiating a CAS command via a bus communicatively coupled to the hardware CAS module;
   storing the first result value at a second memory;
   performing, at the hardware CAS module, the atomic operation for a second request from a second request agent and obtaining a second result value; and
   responsive to determining a failure to successfully process one or more of the first request or the second request, repetitively performing, at the hardware CAS module, the atomic operation, for one or more of the first request or the second request associated with the determined failure.

2. The method of claim 1, further comprising:
   performing, at the hardware CAS module, the atomic operation for a third request from a third request agent and obtaining a third result value,
   wherein responsive to determining includes responsive to determining a failure to successfully process one or more of the first request, the second request, or the third request, repetitively performing, at the hardware CAS module, the atomic operation, for one or more of the first request, the second request, or the third request associated with the determined failure,
   wherein the first request comprises the first request from the first request agent for the atomic operation to be performed on a data value that is shared among a plurality of request agents.

3. The method of claim 1, wherein performing the atomic operation includes initiating operation of the CAS command that is native to the bus, wherein the bus includes a Peripheral Component Interconnect Express (PCIe) bus.

4. The method of claim 1, wherein the first request comprises a data value shared among a plurality of users and stored at a first memory, and further comprising:
   storing the first result value at a second memory; and
   storing the second result value at the second memory.

5. The method of claim 4, wherein the hardware CAS module is agnostic to types of atomic operations.

6. The method of claim 1, further comprising:
   incrementing a loop counter that stores a count of repetitions of performance of the atomic operation at the hardware CAS module.

7. The method of claim 6, further comprising:
   determining a live-lock status based on the count of repetitions, and, in response to the count of repetitions exceeding a predetermined threshold value, ceasing repetitively performing.

8. A processing system comprising:
   a hardware compare and swap (CAS) module communicatively coupled to a bus, the hardware CAS module to:
   perform an atomic operation in response to a first request from a first request agent for the atomic operation to be performed on a data value that is shared among a plurality of request agents and stored at a first memory, and obtain a first result value, the atomic operation including initiating a CAS command via the bus;
   store the first result value at a second memory;
   perform the atomic operation in response to a second request from a second request agent and obtain a second result value; and
   responsive to determining a failure to successfully process one or more of the first request or the second request, repetitively performing the atomic operation, for one or more of the first request or the second request associated with the determined failure.

9. The processing system of claim 8, wherein the hardware CAS module is further to:
   perform the atomic operation for a third request from a third request agent and obtain a third result value,
   wherein responsive to determining includes responsive to determining a failure to successfully process one or more of the first request, the second request, or the third request, repetitively perform the atomic operation, for one or more of the first request, the second request, or the third request.

10. The processing system of claim 8, wherein:
    performing the atomic operation includes initiating operation of the CAS command that is native to the bus, wherein the bus includes a Peripheral Component Interconnect Express (PCIe) bus.

11. The processing system of claim 8, wherein the data value is stored at a first memory; and
    the first result value and the second result value are stored at a second memory.

12. The processing system of claim 11, wherein:
    the hardware CAS module is agnostic to types of atomic operations.

13. The processing system of claim 8, wherein the hardware CAS module is further to:
    increment a loop counter that stores a count of repetitions of performance of the atomic operation at the hardware CAS module.

14. The processing system of claim 13, wherein the hardware CAS module is further to:
    determine a live-lock status based on the count of repetitions, and, in response to the count of repetitions exceeding a predetermined threshold value, cease repetitively performing.

15. A method comprising:
    receiving, at a hardware compare and swap (CAS) module, a first request for an atomic operation on a data value that is shared among a plurality of users, the first request including the data value and a first operand value;
    receiving, at the hardware CAS module, a second request for the atomic operation on the data value, the second request including the data value and the first operand value;

responsive to the first request, storing the data value in a first memory, performing the atomic operation to generate a first computed value, and storing the first computed value in a second memory storing updated data values, the atomic operation including a CAS operation that is native to a bus that is communicatively coupled to the hardware CAS module;

responsive to the second request, storing the data value in the first memory, performing the atomic operation, including the CAS operation, to generate a second computed value, and storing the second computed value in the second memory;

determining a first success status of the first request based on a first result of the CAS operation for the first request;

determining a second success status of the second request based on a second result of the CAS operation for the second request; and responsive to determining a negative success status for one or more of the first request or the second request, updating the data value using the first computed value, and repetitively performing, at the hardware CAS module, the atomic operation, for one or more of the first request or the second request associated with the negative success status.

16. The method of claim 15, further comprising:

determining, at the hardware CAS module, that there are no remaining requests for the atomic operation on the data value; and ceasing repetitive performance of the atomic operation.

17. The method of claim 15, wherein:

repetitively performing, at the hardware CAS module, the atomic operation, includes incrementing a loop counter that stores a count of repetitions of performance of the atomic operation at the hardware CAS module.

18. The method of claim 17, wherein:

repetitively performing the atomic operation includes determining a live-lock status based on accessing the loop counter, and, responsive to determining that the loop counter exceeds a predetermined threshold counter value, ceasing the repetitive performance.

19. The method of claim 15, wherein:

determining the first success status of the first request includes determining whether the first result includes a CAS returned value that is equal to the data value, as submitted to the CAS operation for the first request.

20. The method of claim 19, wherein:

determining the first success status of the first request includes determining a positive success status based on determining that the first result includes a CAS returned value that is equal to the data value, as submitted to the CAS operation for the first request, and determining a negative success status based on determining that the first result includes a CAS returned value that is unequal to the data value, as submitted to the CAS operation for the first request.

* * * * *